US012404986B2

(12) United States Patent
Xu et al.

(10) Patent No.: US 12,404,986 B2
(45) Date of Patent: Sep. 2, 2025

(54) LENS AND LED LAMP THEREOF

(71) Applicant: ABL IP Holding LLC, Atlanta, GA (US)

(72) Inventors: Jianyong Xu, Shenzhen (CN); Zhigang He, Shenzhen (CN); Qi Ai, Peachtree City, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 18/670,404

(22) Filed: May 21, 2024

(65) Prior Publication Data

US 2025/0243987 A1 Jul. 31, 2025

(30) Foreign Application Priority Data

Jan. 29, 2024 (CN) ......................... 202420211377.0

(51) Int. Cl.

| | |
|---|---|
| ***F21V 5/04*** | (2006.01) |
| ***F21V 5/00*** | (2018.01) |
| ***F21V 19/00*** | (2006.01) |
| ***F21V 21/08*** | (2006.01) |
| ***F21V 29/503*** | (2015.01) |
| *F21Y 105/18* | (2016.01) |
| *F21Y 113/13* | (2016.01) |
| *F21Y 115/10* | (2016.01) |

(52) U.S. Cl.

CPC ............ *F21V 5/007* (2013.01); *F21V 19/003* (2013.01); *F21V 21/08* (2013.01); *F21V 29/503* (2015.01); *F21Y 2105/18* (2016.08); *F21Y 2113/13* (2016.08); *F21Y 2115/10* (2016.08)

(58) Field of Classification Search

CPC ........ F21V 5/007; F21V 19/003; F21V 21/08; F21V 29/503

See application file for complete search history.

(56) References Cited

U.S. PATENT DOCUMENTS

| | | | | |
|---|---|---|---|---|
| 8,897,631 B2 * | 11/2014 | Kasai | ................ | H01L 21/67115 392/407 |
| 2003/0112523 A1 * | 6/2003 | Daniell | ................ | G02B 3/0075 348/E13.043 |
| 2018/0245771 A1 * | 8/2018 | Liu | ........................... | F21V 5/04 |
| 2021/0317969 A1 * | 10/2021 | Hara | ..................... | F21S 41/285 |

* cited by examiner

*Primary Examiner* — Tracie Y Green

(74) *Attorney, Agent, or Firm* — Kilpatrick Townsend & Stockton LLP

(57) ABSTRACT

The present disclosure provides a lens and an LED lamp thereof, the lens used in conjunction with a light source and including a housing that includes a first body and a second body, the first body including a first surface and a plurality of astigmatic members protruding from the first surface to a side of the light source, the second body including a second surface opposite to the first surface and arranged away from the light source, a plurality of convergent light members protruding outwardly from the second surface away from a side of the light source. Light emitted from the light source is dispersed through the plurality of astigmatic members, and then converged through the plurality of convergent light members before being directed towards the outside.

20 Claims, 10 Drawing Sheets

LENS AND LED LAMP THEREOF

CROSS-REFERENCE TO RELATED APPLICATION

This application claims the benefit of priority from Chinese Patent Application No. 202420211377.0 entitled "TRANSPARENT COVER PLATE" and filed on Jan. 29, 2024, the content of which is hereby incorporated by reference in its entire by reference.

BACKGROUND

Technical Field

The present disclosure generally relates to the field of lenses, and especially relates to a lens and an LED lamp thereof.

Description of Related Art

A lens is an optical element made of a transparent material, which is made according to a refraction principle of light and is usually an essential part of an LED lamp. The lens is configured to match light of a light source of the LED lamp to create different lighting effects.

The lens is a refracting mirror that typically has two surfaces. The lenses on the market mainly include three types: a double-concave lens, a flat-concave lens, and a convex-concave lens. The double-concave lens has two concave surfaces, the flat-concave lens has a flat surface and a concave surface, and the convex-concave lens has a concave surface and a convex surface.

The two surfaces of a commonly used lens are either convex or concave as a whole. Such lens has the same focal point, without having a mixing effect, in this way, a transmitted light spot is uneven, which is prone to color differences (such as a blue light, or a yellow and white light), rather than meeting requirements of anti-glare.

Therefore, a new improved lens that should be designed to solve the above problems is of great significance.

SUMMARY

The technical problems to be solved: in view of the shortcomings of the related art, the present disclosure provides a lens and an LED lamp thereof which can solve the problems above mentioned in the related art.

In a first aspect, a lens according to an embodiment of the present disclosure is used in conjunction with a light source and includes a housing, the housing including a first body and a second body, the first body including a first surface and a plurality of astigmatic members, the second body including a second surface and a plurality of convergent light members; the first surface opposite to the second surface and arranged close to the light source, the second surface arranged away from the light source, the plurality of astigmatic members protruding from the first surface to a side of the light source, the plurality of convergent light members protruding outwardly from the second surface away from a side of the light source, light emitted from the light source dispersed through the plurality of astigmatic members, and then converged through the plurality of convergent light members before being directed towards the outside.

In a second aspect, an LED lamp according to an embodiment of the present disclosure includes a lens, a power box, a heat sink, an LED light board and a frame, both the frame and the power box fixedly connected to the heat sink, the LED light board and the lens sequentially installed on the heat sink; and wherein the lens includes a housing, the housing including a first surface and a second surface opposite to the first surface, the first surface arranged close to the LED light board, and the second surface arranged away from the LED light board; the first surface including a plurality of astigmatic members protruding towards a side of the LED light board, and the second surface including a plurality of convergent light members protruding outwardly away from the side of the LED light board; and wherein light emitted from the LED light board dispersed through the plurality of astigmatic members, and then converged through the plurality of convergent light members before being directed towards the outside.

The present disclosure provides the advantages as below: the present disclosure provides the lens that uses the plurality of astigmatic members for light mixing treatment, and then re-converging light through the plurality of convergent light members to form light without color differences and meet anti-glare requirements for transmission to the outside.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

Figure 1:
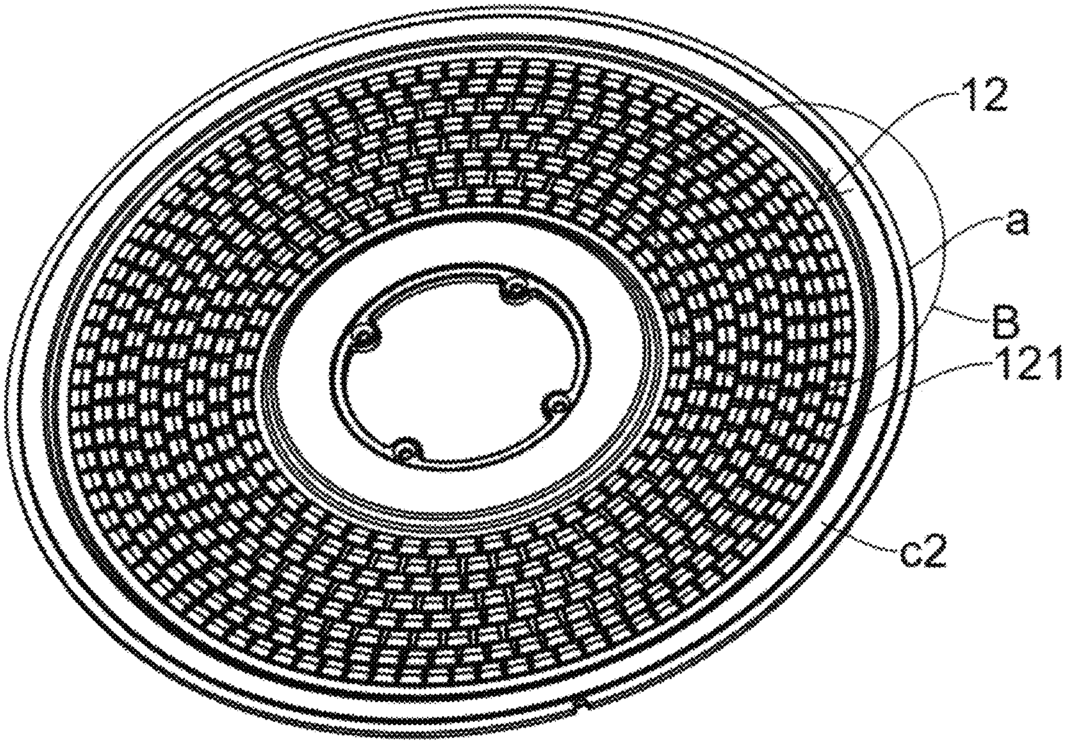
FIG. 1 is a schematic view of a lens in accordance with an embodiment of the present disclosure.

The element labels according to the embodiment of the present disclosure shown as below:

10 lens, a housing, d middle portion, 11 first surface, 111 astigmatic member, 111*a* light-entering surface, 12 second surface, 121 convergent light member, 121*a* light-emitting surface, 122 first gap, 123 second gap, 13 fixing base, 131 first installation hole, b light source, 20 power box, 30 heat sink, 31 receiving room, 32 seat, 321 second installation hole, e middle section, 40 LED light board, 41 board body, 42 light bead, 43 third gap, 44 fourth gap, 44 fifth gap, 50 frame, 60 dimming radar, 70 hook, 80 screw, c1 first body, c2 second body, L axis.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. Obviously, the implementation embodiment in the description is a part of the present disclosure implementation examples, rather than the implementation of all embodiments, examples. According to the described exemplary embodiment of the present disclosure, all other embodiments obtained by one of ordinary skill in the related art on the premise of no creative work are within the protection scope of the present disclosure.

It should also be understood that the terms used in the specification of the present disclosure are only for the purpose of describing specific embodiments without being intended to limit the present disclosure. As used in the description of the present disclosure and the appended claims, terms of "one", "one" and "the" in a singular form are intended to include a plural form unless the context clearly indicates otherwise.

It should also be further understood that the term "and/or" used in the description of the present disclosure and the appended claims refers to any combination of one or more of associated listed items and all possible combinations, and includes these combinations.

Referring to FIGS. 1-7, a lens 10 according to an embodiment of the present disclosure is used in conjunction with a light source b and includes a housing a, the housing a including a first body c1 and a second body c2, the first body c1 including a first surface 11 and a plurality of astigmatic members 111, the second body c2 including a second surface 12 and a plurality of convergent light members 121. The first surface 11 is opposite to the second surface 12 and arranged close to the light source b, and the second surface 12 is arranged away from the light source b. The plurality of astigmatic members 111 protrudes from the first surface 11 to a side of the light source b, the plurality of convergent light members 121 protruding outwardly from the second surface 12 away from a side of the light source b, light emitted from the light source b dispersed through the plurality of astigmatic members 111, and then converged through the plurality of convergent light members 121 before being directed towards the outside.

In an embodiment of the present disclosure, the first body c1 is integrated with the second body c2.

In other embodiments of the present disclosure, the first body c1 is assembled to the second body c2, that is, the first body c1 and the second body c2 are two separate elements.

Figure 5:
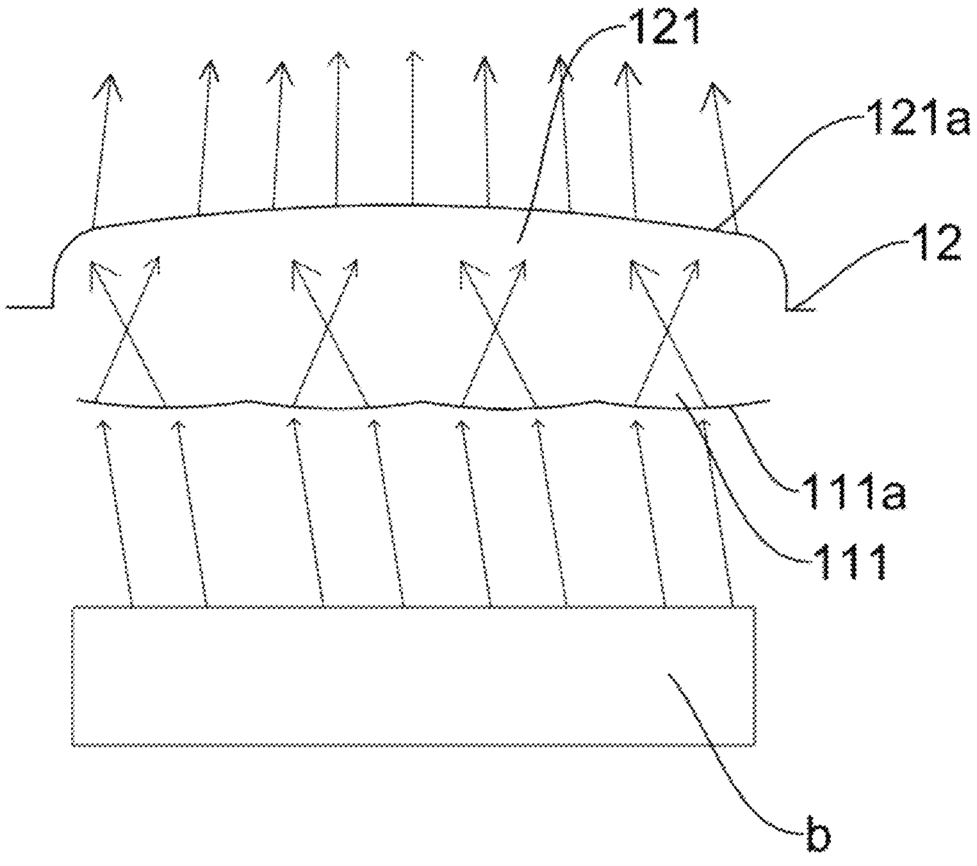
FIG. 5 is a schematic view of an optical path principle of the lens of FIG. 1.
Figure 11:
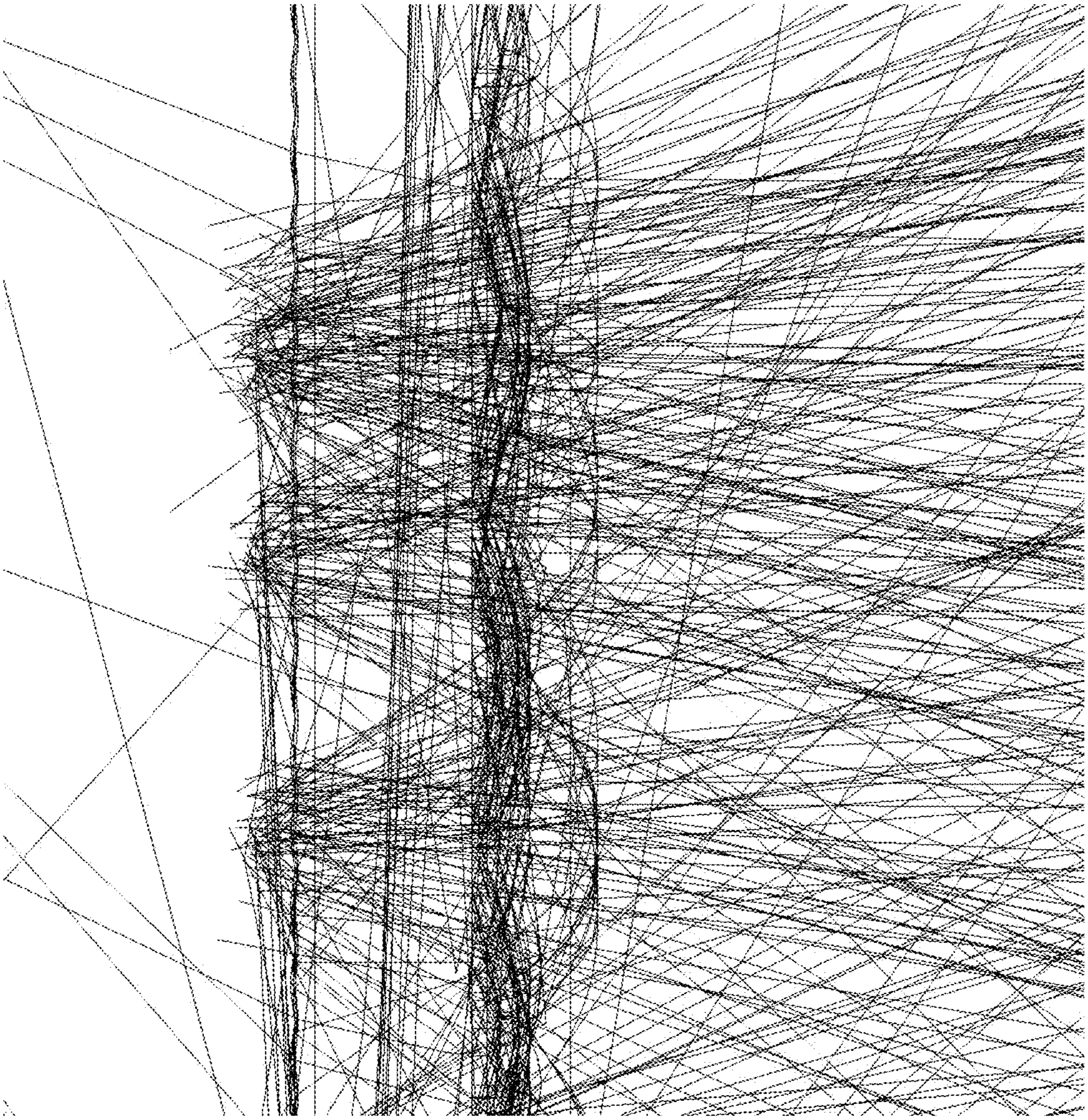
FIG. 11 is a schematic view of ray tracing of the LED lamp of FIG. 8.
Figure 12:
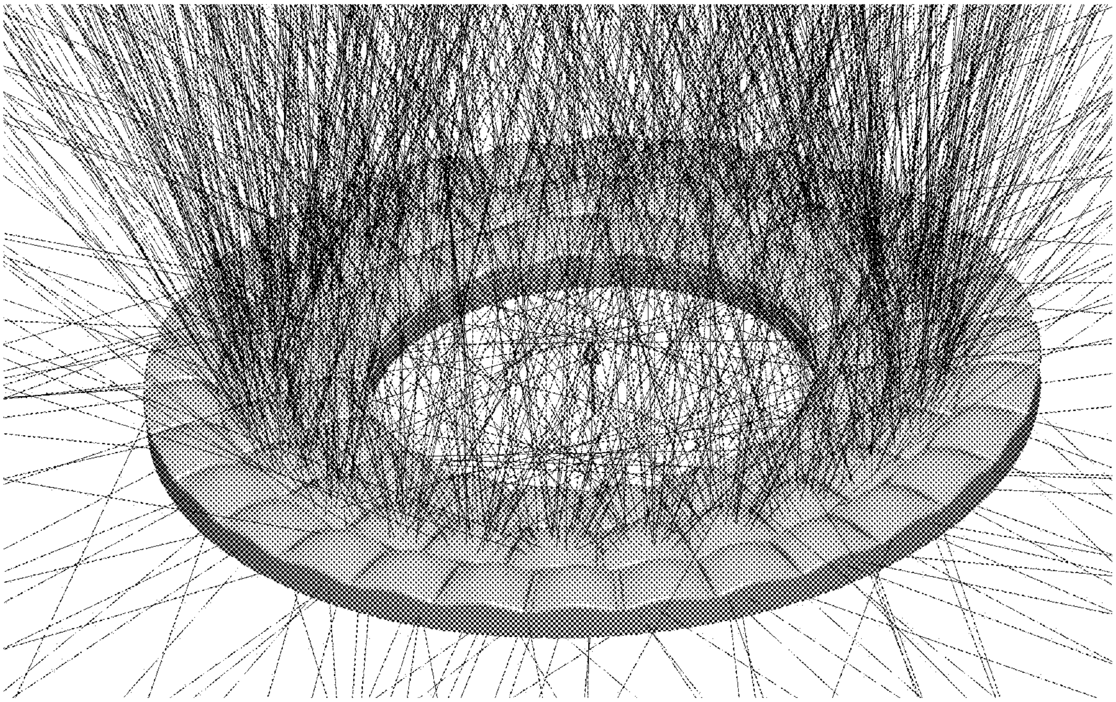
FIG. 12 is a schematic view of light passing through a light-emitting surface of the LED lamp of FIG. 8.

Referring to FIG. 5 and FIGS. 11-12, the plurality of astigmatic members 111 is arranged on the first surface 11 of the housing a, and the plurality of convergent light members 121 is arranged on the second surface 12, the light emitted from the light source b first passes through the plurality of astigmatic members 111 to mix the light, that is, to scatter the light spot and prevent a color difference thereof. Due to a fact that the plurality of astigmatic members 111 are convex surfaces towards the side of the light source b, that is, the plurality of astigmatic members 111 form a curved surface towards the side of the light source b. The light emitted from the light source b will be refracted through the plurality of astigmatic members 111 to the side of the plurality of astigmatic members 111 far from the light source b and mixed together in a middle of the plurality of astigmatic members 111. That is, the light emitted from the light source b will be refracted from the plurality of astigmatic members 111 to the middle position of the side of the light source b and from the plurality of astigmatic members 111 to a peripheral position of the side of the light source b to the side away from the light source b and towards the middle portion of the plurality of astigmatic members 111 for mixing light, so that mixed light spots are uniform without color differences thereof. At the same time, the light spot that has already passed a first mixing process is soft, so that glare can be reduced. The light spot that has been mixed will then be re-aggregated through each of the plurality of convergent light members 121 to form light with non-color differences and meeting anti-glare requirements to the outside. Due to the dispersion of the plurality of astigmatic members 111 through the first process, the light will be uniform and soft without a color difference thereof, and then, the light that has been re-aggregated by the plurality of convergent light members 121 will be softer and non-glared. The plurality of convergent light members 121 of the present disclosure are equivalent to forming a plurality of convex lenses, with each convex lens having a focal point that is not in a single position. The light emitted by the light source b Light passes through the plurality of astigmatic members 111 to be dispersed, and then the scattered light passes through the plurality of e convex lenses to be re-aggregated to form more uniform light without color differences, which also meets the requirements of anti-glare. The lens on the market has a concave surface and a convex surface to only form a convex lens on the market, which has the same direction of light focus. Therefore, the light on the market is more concentrated and uneven, resulting in color differences thereof. The present disclosure forms a plurality of convex lenses to have different directions of light focus, so that light is more uniform without color differences thereof.

Figure 3:
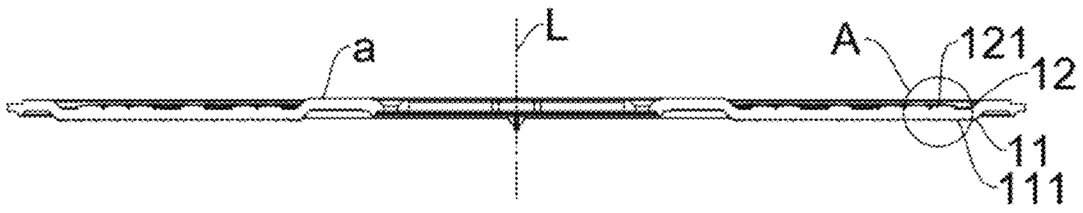
FIG. 3 is a cross-sectional view of the lens of FIG. 1.
Figure 4:
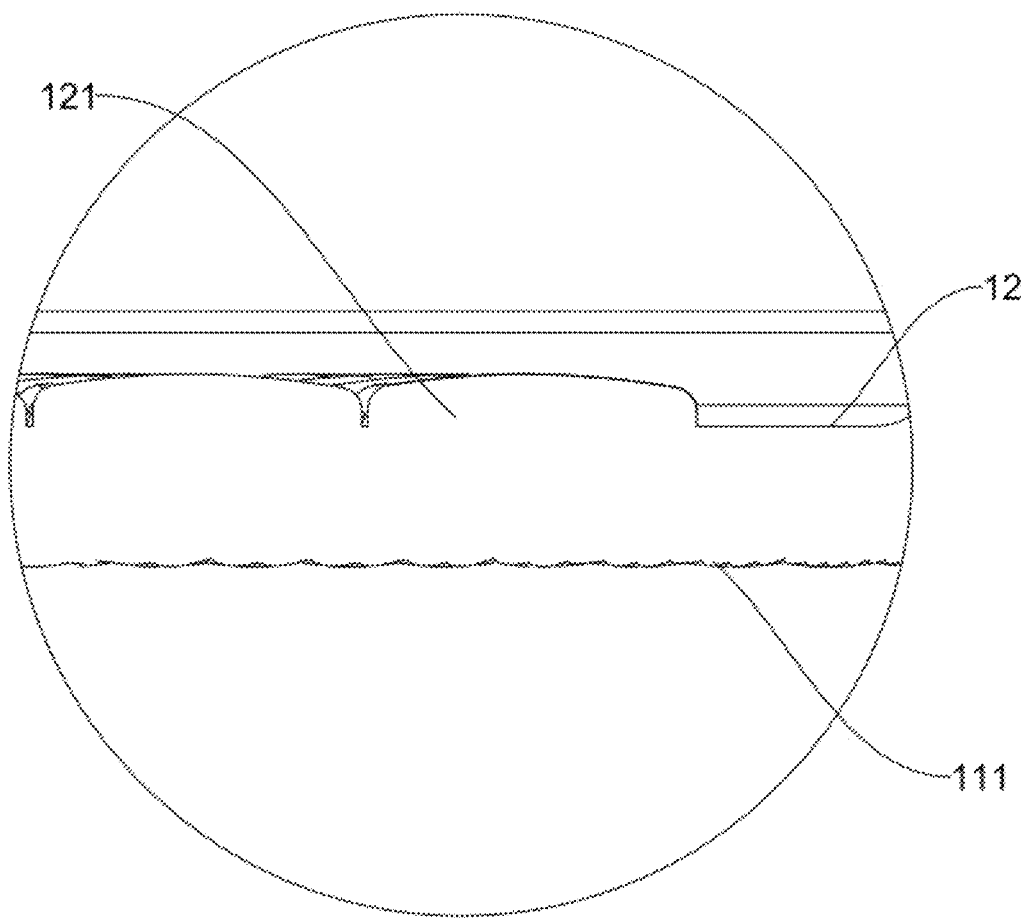
FIG. 4 is a partial enlarged view of a circle A of FIG. 3.
Figure 6:
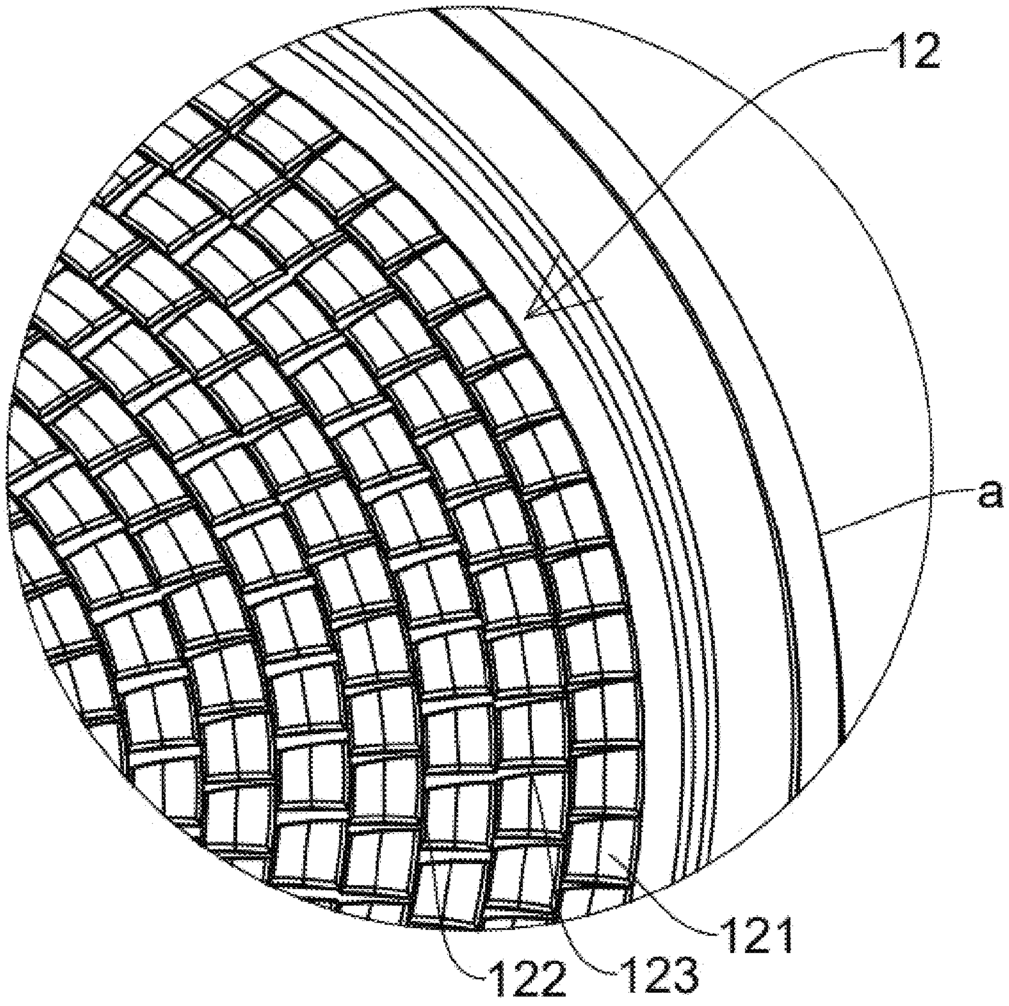
FIG. 6 is a partial enlarged view of a circle B of FIG. 1.

In an embodiment of the present disclosure, referring to FIG. 1, FIG. 3, and FIG. 6, the plurality of convergent light members 121 is uniformly arranged on the second surface 12 in a circular pattern around an axis L of the housing a, with a center of each ring being the same, a first gap 122 formed between adjacent rings, and a second gap 123 also formed between two adjacent convergent light members 121 of the same ring; and wherein a radius of the ring close the axis L of the housing a is the smallest, and then radiuses of the rings increase gradually from the axis L to a direction away from the axis L. Because the plurality of convergent light members 121 is uniformly arranged in a circular pattern, that is, the plurality of convergent light members 121 is arranged in a staggered manner around the axis L of the housing a. The light emitted by the light source b can be stacked in a staggered manner after passing through the plurality of convergent light members 121, resulting in a better mixing effect, in this way, the light spot is very round and has a higher brightness, while also making the light spot more mixed and less prone to color differences thereof.

In an embodiment of the present disclosure, a width of the first gap 122 is smaller than that of the second gap 123.

Figure 2:
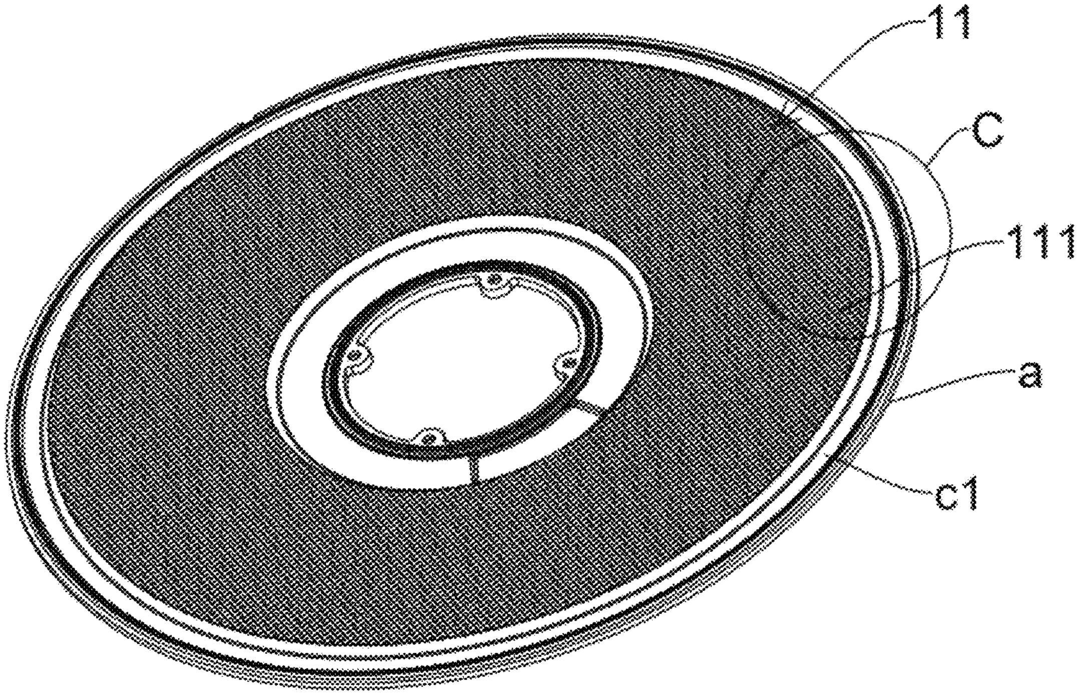
FIG. 2 is similar to FIG. 1, but shown from another view.
Figure 7:
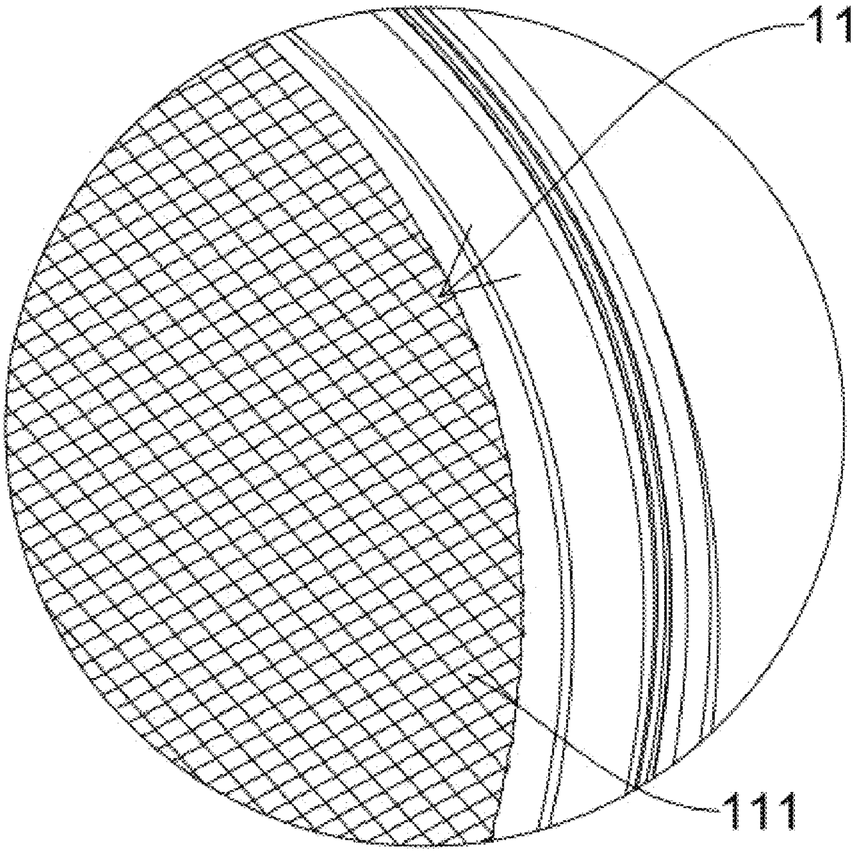
FIG. 7 is a partial enlarged view of a circle C of FIG. 2.

Referring to FIG. 2 and FIG. 7, the plurality of astigmatic members 111 is uniformly arranged on the first surface 11 in a matrix manner, adjacent rows of astigmatic members 111 of the plurality of astigmatic members 111 in the matrix abutting against each other, and adjacent astigmatic members 111 in the same row abutting against each other, wherein an area of the plurality of astigmatic members 111 arranged on the first surface 11 is roughly the same as an area of the plurality of convergent light members 121 arranged on the second surface 12. Such arrangement of the plurality of astigmatic members 111 can better refract the mixed light spots of the plurality of astigmatic members 111 to the plurality of convergent light members 121, and correspondingly control the light with a large angle, resulting in a lower glare value thereof.

Because adjacent rows of astigmatic members 111 of the plurality of astigmatic members 111 in the matrix abut against each other, and adjacent astigmatic members 111 in the same row abut against each other, that is, there is no gap formed between adjacent rows of astigmatic members 111 of the plurality of astigmatic members 111 in the matrix, and there is no gap formed between adjacent astigmatic members 111 in the same row. After the light emitted from the light source b passes through the first surface 11 and enters the astigmatic member 111 to fully mix all light, and then the mixed light is concentrated through the convergent light member 121. At the same time, the first gap 122 is formed between two adjacent rings, and the second gap 123 is formed between two convergent light members 121 of the same ring, which can provide a sufficient space for gathering light with a large angle, so as to reduce dazzle thereof.

In an optical embodiment of the present disclosure, each convergent light member 121 corresponds to the plurality of astigmatic members 111, that is, one convergent light member 121 faces the plurality of astigmatic members 111, and the light emitted by the light source b is scattered by the plurality of astigmatic members 111, and then transmitted to the outside through each convergent light member 121. Such structural setting is provided in the present disclosure, a plurality of convex lens units can be formed, with each convergent light member 121 forming one convex lens unit. The light of each convex lens unit is focused in a direction, and the direction of light focus of each unit is different. Therefore, the comprehensive light directed towards the outside is more uniform and soft.

In an embodiment of the present disclosure, the number of astigmatic members 111 is greater than the number of convergent light members 121.

Each of the plurality of convergent light members 121 includes a light-emitting surface 121*a* arranged on the side away from the light source b and directly opposite to the astigmatic member 111. The light-emitting surface 121*a* is a curved surface protruding towards the side away from the light source b, thus forming a convex lens with a focusing function. The light passing through the housing a passes through the light-emitting surface 121*a* to be concentrated, and a focus of the convex lens that is formed is different, so that the light emitted to the outside is more uniform.

The astigmatic member 111 includes a light-entering surface 111*a* arranged on the side close to the light source b and directly facing the light source b. The light-entering surface 111*a* is a curved surface protruding towards the side of the light source b. Due to the fact that the astigmatic member 111 is a raised surface towards the side of the light source b, the light emitted by the light source b will be refracted through the light-entering surface 111*a* of the astigmatic member 111 to the side away from the light source b and mixed together towards the middle of the astigmatic member 111.

In an optical embodiment of the present disclosure, the plurality of astigmatic members 111 is connected to each other, that is, surfaces of the plurality of astigmatic members 111 are connected to form the uneven first surface 11. The plurality of convergent light members 121 is arranged in intervals, that is, there is a gap between every two convergent light members 121, and the plurality of convergent light members 121 protrudes from the second surface 12. Referring to FIG. 1 and FIG. 6, in an embodiment of the present disclosure, the housing a is disc-shaped and the plurality of convergent light members 121 is uniformly arranged around the axis L of the housing a.

In an embodiment of the present disclosure, the second surface 12 is a plane, a projection of the light-emitting surface 121*a* on the second surface 12 is trapezoidal, and a projection of the light-entering surface 111*a* on the first surface 11 is a diamond shape.

It should be noted that the projection of the light-emitting surface 121*a* on the second surface 12 and the projection of the light-entering surface 111*a* on the first surface 11 can also be of other shapes, for example, the projection of the light-emitting surface 121*a* on the second surface 12 can be circular, regular polygon, etc., and the projection of the light-entering surface 111*a* on the first surface 11 can be triangular, circular, etc. As long as the light-emitting surface 121*a* protrudes towards the side away from the light source b, and the light-entering surface 111*a* protrudes towards the side close to the light source b, it is sufficient.

Figure 8:
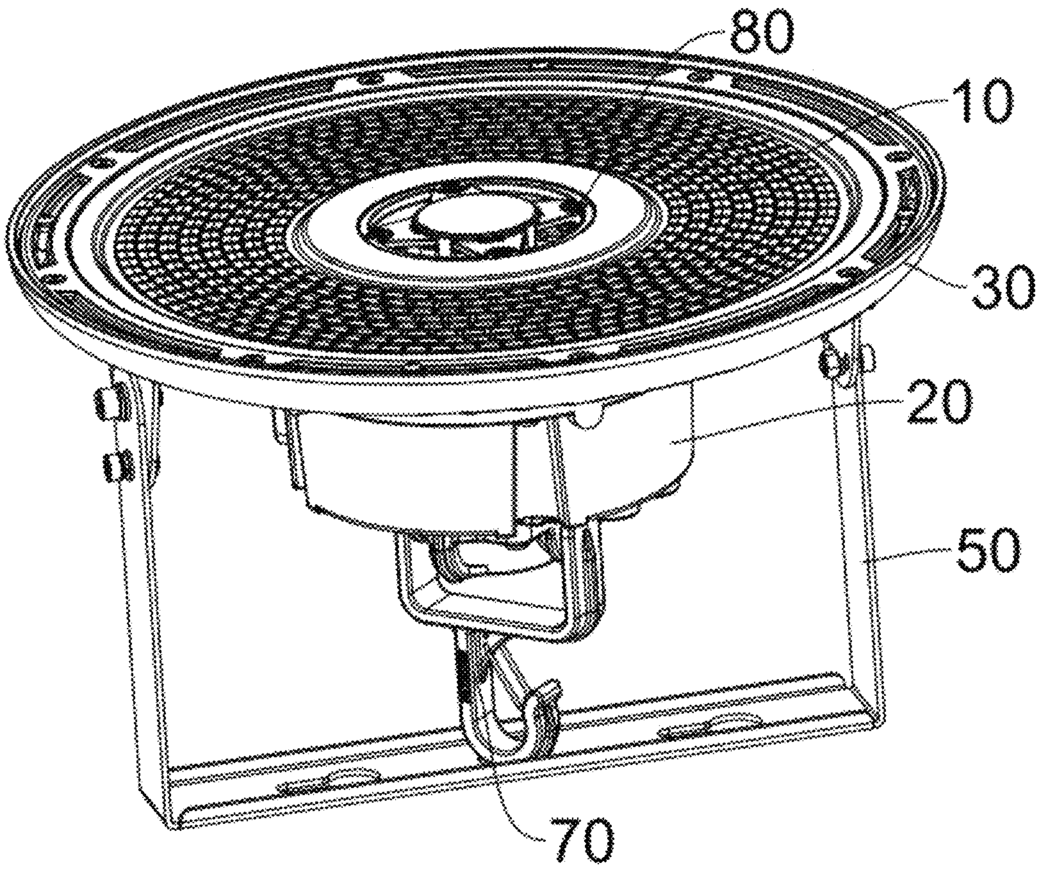
FIG. 8 is a schematic view of an LED lamp in accordance with an embodiment of the present disclosure.
Figure 9:
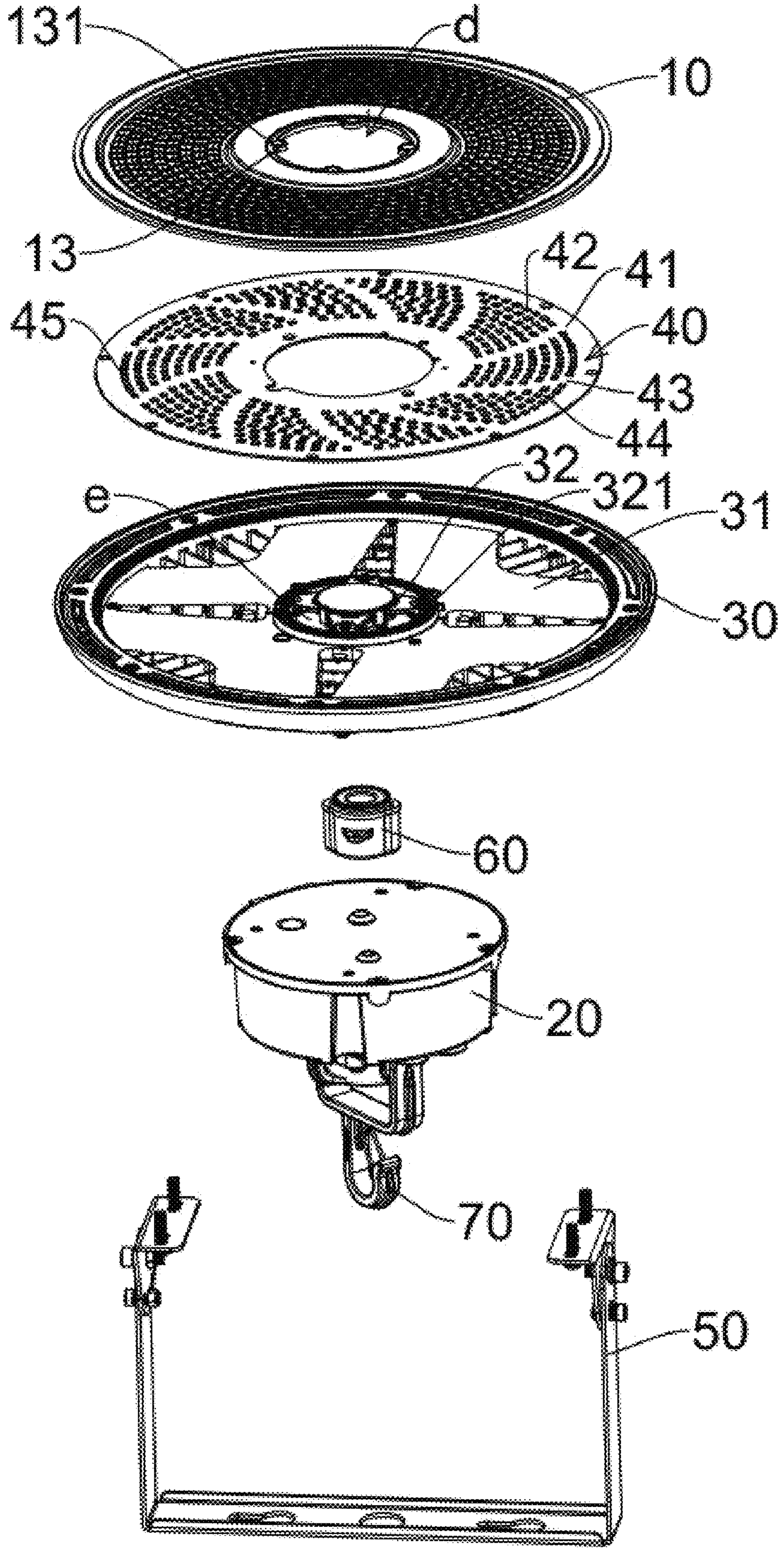
FIG. 9 is an exploded, schematic view of the LED lamp of FIG. 8.
Figure 10:
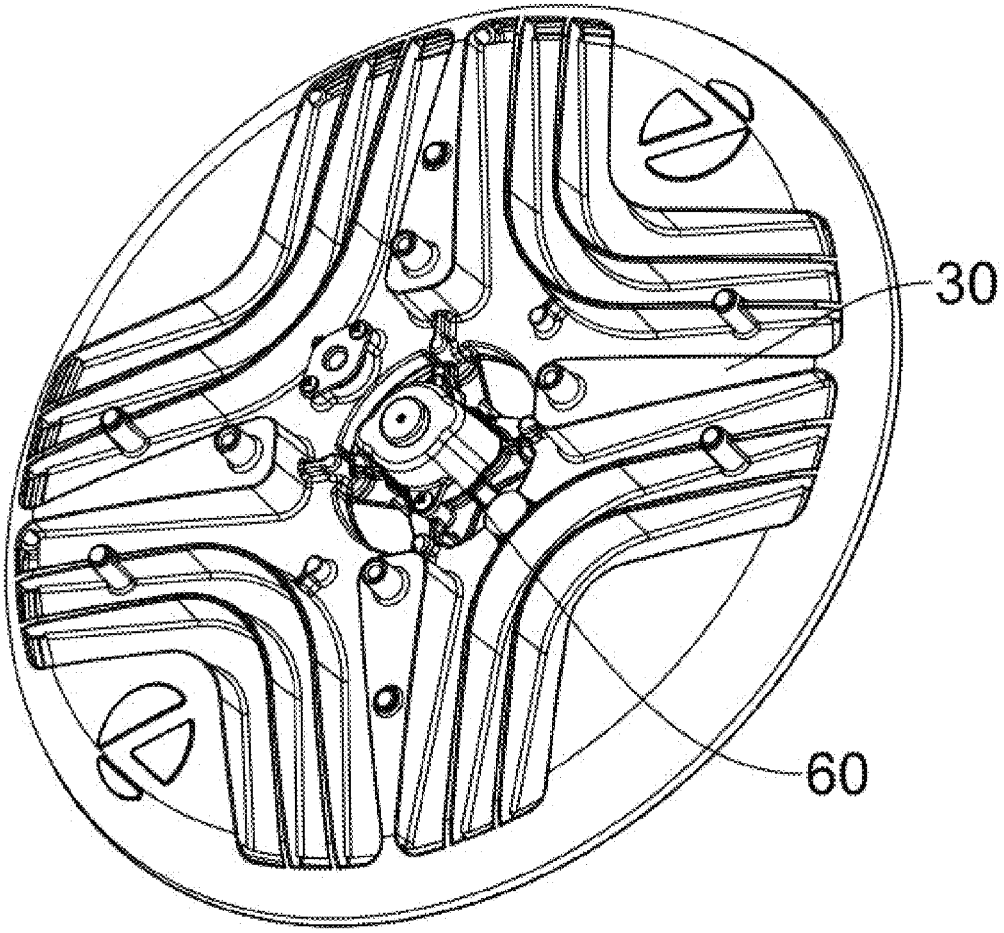
FIG. 10 is a partial schematic view of the LED lamp of FIG. 8.

Referring to FIG. 8 to FIG. 10, an LED lamp according to an embodiment of the present disclosure includes a power box 20, a heat sink 30, an LED light board 40, a frame 50 and the above lens 10. Both the frame 50 and the power box 20 are fixedly connected to the heat sink 30, and the LED light board 40 and the lens 10 are sequentially installed on the heat sink 30. The frame 50 is configured to fix the LED lamp to the outside, and a specific fixing method can be using screws to fix the frame 50.

The LED light board 40 includes a board body 41 with a circular ring shape, and a plurality of light beads 42 uniformly arranged on the board body 41 in a plurality of fan-shaped ways, a third gap 43 formed between the plurality of light beads 42 in adjacent two fan shapes, a fourth gap 44 also formed between adjacent two rows of light beads 42 in the same fan shape, and a fifth gap 45 formed between adjacent two light beads 42 in the same row. An area of the plurality of light beads 42 arranged on the board body 41 is roughly the same as an area of the plurality of convergent light members 121 arranged on the second surface 12.

In an embodiment of the present disclosure, a width of the third gap 43 is greater than a width of the fourth gap 44, and the width of the fourth gap 44 is greater than that of the fifth gap 45.

In an embodiment of the present disclosure, an arrangement direction and a quantity of all fan-shaped light beads 42 are the same, and all fan-shaped light beads 42 in the same row form a circle, with a center of the formed circle being the same as that of the board body 41. For example, a first row of light beads 42 in a first sector, together with the first row of light beads 42 in a second sector, and the first row of light beads 42 in a n-th sector, cooperatively form a first circle, and so on. An m-th row of light beads 42 in the first sector, together with the m-th row of light beads 42 in the second sector, and the m-th row of light beads 42 in the n-th sector, cooperatively form an m-th circle. A radius of the first circle is the smallest, a radius of the m-th circle is the largest, and the radius from the first circle to the m-th circle increases sequentially.

The arrangement of the plurality of light beads 42 can better disperse the light emitted from the light source b by the plurality of astigmatic members 111, and pass through each convergent light member 121 to be concentrated, and finally transmit the uniform and anti-glare light spot to the outside.

The heat sink 30 includes a receiving room 31 for receiving the LED light board 40 therein, and the lens 10 is covered on the LED light board 40. The light emitted from the LED light board 40 passes through the lens 10 to be emitted more uniform without color differences thereof, which can prevent anti-glare.

In an embodiment of the present disclosure, the lens 10 is circular to be compatible with the LED light board 40. The lens 10 can be arranged in other compatible shapes according to the LED light board 40, such as a square. A plurality of fixing bases 13 is arranged in a middle portion d of the lens 10, and a seat 32 is arranged in a middle section e of the heat sink 30. Each of the plurality of fixing base 13 includes a first installation hole 131, and the seat 32 includes a plurality of second installation holes 321. The lens 10 is fixed on the heat sink 30 by threading screws 80 through the first installation hole 131 and the plurality of second installation holes 321. Specifically, there are four seats 32 evenly arranged around the axis L of the lens 10. The first installation hole 131 corresponds to the second installation hole 321 one-by-one. In an optional embodiment of the present disclosure, the LED lamp further includes a hook 70 installed on the power box 20, and configured to hang the LED lamp. The embodiment of the present disclosure is applicable to vertical lighting situations, when a vertical lighting is needed, the hook 70 of the present disclosure can be directly hung on a hook for being used.

In an optional embodiment of the present disclosure, the LED lamp of the present disclosure also includes a dimming radar 60 installed on the heat sink 30. The dimming radar 60 is arranged directly at the center of the lens 10. In an embodiment of the present disclosure, the dimming radar 60 is arrange at a side of the seat 32 far from the lens 10 and configured to adjust light intensity to implement accurate light adjustment. In an embodiment of the present disclosure, the seat 32 passes through the LED light board 40 and the lens 10.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. A lens used in conjunction with a light source and comprising a housing, the housing comprising a first body and a second body, the first body comprising a first surface and a plurality of astigmatic members, the second body comprising a second surface and a plurality of convergent light members, the first surface opposite to the second surface and adapted to be arranged closer to the light source than the second surface, the second surface arranged away from the light source, the plurality of astigmatic members protruding from the first surface toward the light source, the plurality of convergent light members protruding outwardly from the second surface away from the light source, wherein light emitted from the light source dispersed through the plurality of astigmatic members and then converged through the plurality of convergent light members before being directed towards the outside.

2. The lens as claimed in claim 1, wherein the plurality of convergent light members is uniformly arranged on the second surface in a circular pattern to form rings around an axis of the housing, with a center of each ring being the same, a first gap formed between adjacent rings and a second gap also formed between adjacent convergent light members of the same ring, wherein a radius of the ring closest to the axis of the housing is the smallest and radiuses of the rings increase gradually from the axis in a direction away from the axis.

3. The lens as claimed in claim 2, wherein the plurality of astigmatic members is uniformly arranged on the first surface in a matrix to form rows, adjacent rows of astigmatic members of the plurality of astigmatic members in the matrix abutting against each other and adjacent astigmatic members in the same row abutting against each other, wherein an area of the plurality of astigmatic members arranged on the first surface is substantially the same as an area of the plurality of convergent light members arranged on the second surface.

4. The lens as claimed in claim 3, wherein each of the plurality of convergent light members comprises a light-emitting surface and wherein the light-emitting surface is a curved surface protruding away from the light source.

5. The lens as claimed in claim 4, wherein each of the plurality of astigmatic members comprises a light-entering surface directly facing the light source and wherein the light-entering surface is a curved surface protruding towards the light source.

6. The lens as claimed in claim 4, wherein a projection of the light-emitting surface on the second surface is trapezoidal.

7. The lens as claimed in claim 5, wherein a projection of the light-entering surface on the first surface is a diamond shape.

8. The lens as claimed in claim 1, wherein the first body is integrated with the second body.

9. The lens as claimed in claim 1, wherein the first body and the second body are two separate elements assembled to each other to form the housing.

10. An LED lamp comprising a lens, a power box, a heat sink, an LED light board and a frame, wherein both the frame and the power box are fixedly connected to the heat sink and the LED light board and the lens are installed on the heat sink, wherein the lens comprises a housing, the housing comprising a first surface and a second surface opposite to the first surface, the first surface arranged closer to the LED light board than the second surface and the second surface arranged away from the LED light board the first surface comprising a plurality of astigmatic members protruding towards the LED light board and the second surface comprising a plurality of convergent light members protruding outwardly away from the LED light board, wherein light emitted from the LED light board is dispersed through the plurality of astigmatic members and then converged through the plurality of convergent light members before being directed towards the outside.

11. The LED lamp as claimed in claim 10, wherein the plurality of convergent light members is uniformly arranged on the second surface in a circular pattern to form rings around an axis of the housing, with a center of each ring being the same, a first gap formed between adjacent rings and a second gap formed between adjacent convergent light members of the same ring wherein a radius of the ring closest to the axis of the housing is the smallest and radiuses of the rings increase gradually from the axis in a direction away from the axis.

12. The LED lamp as claimed in claim 11, wherein the plurality of astigmatic members is uniformly arranged on the first surface in a matrix to form rows, adjacent rows of astigmatic members of the plurality of astigmatic members in the matrix abutting against each other and adjacent astigmatic members in the same row abutting against each other, wherein an area of the plurality of astigmatic members arranged on the first surface is roughly the same as an area of the plurality of convergent light members arranged on the second surface.

13. The LED lamp as claimed in claim 12, wherein the LED light board comprises a board body and a plurality of light beads, the plurality of light beads uniformly arranged on the board body in a plurality of fan shapes each comprising rows of light beads, wherein a third gap is formed between adjacent fan shapes, a fourth gap is formed between adjacent rows of light beads within the same fan shape, and a fifth gap is formed between adjacent light beads within the same row of a fan shape.

14. The LED lamp as claimed in claim 13, wherein an area of the plurality of light beads arranged on the board body is substantially the same as the area of the plurality of convergent light members arranged on the second surface.

15. The LED lamp as claimed in claim 12, wherein each of the plurality of convergent light members comprises a light-emitting surface and wherein the light-emitting surface is a curved surface protruding away from the LED light board.

16. The LED lamp as claimed in claim 15, wherein each of the plurality of astigmatic members comprises a light-entering surface directly facing the LED light board and wherein the light-entering surface is a curved surface protruding towards the LED light board.

17. The LED lamp as claimed in claim 10, wherein the heat sink comprises a receiving room for receiving the LED light board therein and wherein the lens covers the LED light board.

18. The LED lamp as claimed in claim 10, wherein the lens is circular and further comprises a plurality of fixing bases arranged in a middle portion of the lens, wherein a seat is arranged in a middle section of the heat sink and wherein the lens is fixed and installed on the heat sink by a screw passing through one of the plurality of fixing bases and the seat.

19. The LED lamp as claimed in claim 10, wherein the LED lamp further comprises a hook installed on the power box.

20. The LED lamp as claimed in claim 10, wherein the LED lamp further comprises a dimming radar installed on the heat sink.

* * * * *